US010673536B2

(12) United States Patent
Sundaram

(10) Patent No.: US 10,673,536 B2
(45) Date of Patent: Jun. 2, 2020

(54) FREE AIR OPTICAL INTERCONNECT BEACON MODE

(71) Applicant: Intel Corporation, Santa Clara, CA (US)

(72) Inventor: Arvind Sundaram, Bangalore (IN)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 16/329,691

(22) PCT Filed: Sep. 29, 2016

(86) PCT No.: PCT/US2016/054462
§ 371 (c)(1),
(2) Date: Feb. 28, 2019

(87) PCT Pub. No.: WO2018/063249
PCT Pub. Date: Apr. 5, 2018

(65) Prior Publication Data
US 2019/0199445 A1   Jun. 27, 2019

(51) Int. Cl.
*H04B 10/80* (2013.01)
*H04B 10/50* (2013.01)
*H04B 10/69* (2013.01)

(52) U.S. Cl.
CPC ......... *H04B 10/803* (2013.01); *H04B 10/503* (2013.01); *H04B 10/6911* (2013.01)

(58) Field of Classification Search
CPC . H04B 10/503; H04B 10/6911; H04B 10/803
USPC .................................................. 398/115–118
See application file for complete search history.

(56) References Cited

U.S. PATENT DOCUMENTS

| 7,296,936 | B2* | 11/2007 | Crews | G02B 6/43 |
| | | | | 385/88 |
| 7,366,423 | B2* | 4/2008 | Levy | G02B 6/4201 |
| | | | | 398/164 |
| 7,433,440 | B2* | 10/2008 | Noguchi | H04L 1/205 |
| | | | | 375/362 |
| 7,912,383 | B2* | 3/2011 | Cheng | H03F 1/0277 |
| | | | | 250/214 A |
| 9,608,733 | B2* | 3/2017 | Pavlas | H04B 10/40 |
| 10,516,490 | B2* | 12/2019 | Sundaram | H04B 10/803 |
| 10,523,338 | B2* | 12/2019 | Sundaram | H04B 10/803 |

(Continued)

FOREIGN PATENT DOCUMENTS

WO   WO-2018063249 A1   4/2018

OTHER PUBLICATIONS

"International Application Serial No. PCT/US2016/054462, International Search Report dated May 23, 2017", 3 pgs.

(Continued)

*Primary Examiner* — Amritbir K Sandhu
(74) *Attorney, Agent, or Firm* — Schwegman Lundberg & Woessner, P.A.

(57) ABSTRACT

An apparatus comprises a laser emitter configured to transmit laser energy across an air gap to a separate device; a photodiode configured to detect laser energy received across the air gap from the separate device; and logic circuitry configured to initiate recurrent transmission of a laser pulse by the laser emitter; and end the recurrent transmission in response to detecting laser energy received by the photodiode from the separate device.

18 Claims, 6 Drawing Sheets

(56) References Cited

U.S. PATENT DOCUMENTS

| | | | |
|---|---|---|---|
| 2001/0021051 A1* | 9/2001 | Kim | H03K 5/1504 |
| | | | 398/147 |
| 2007/0003289 A1* | 1/2007 | Tan | H04B 10/1127 |
| | | | 398/164 |
| 2009/0304384 A1* | 12/2009 | Li | H04B 10/40 |
| | | | 398/58 |
| 2011/0150493 A1* | 6/2011 | Nakaso | H04B 10/1143 |
| | | | 398/130 |
| 2012/0008962 A1* | 1/2012 | Tanaka | H04B 10/40 |
| | | | 398/135 |
| 2012/0310054 A1* | 12/2012 | Birk | A01K 11/007 |
| | | | 600/302 |
| 2013/0087690 A1 | 4/2013 | Sloey et al. | |
| 2015/0349847 A1* | 12/2015 | Hassan-Ali | H04B 5/0031 |
| | | | 455/41.1 |
| 2016/0124165 A1* | 5/2016 | Luo | G02B 6/3855 |
| | | | 385/92 |
| 2019/0089464 A1* | 3/2019 | Redman-White | H04B 10/564 |
| 2019/0190237 A1* | 6/2019 | Sundaram | H04B 10/67 |
| 2019/0190619 A1* | 6/2019 | Sundaram | H04B 10/803 |
| 2019/0199444 A1* | 6/2019 | Sundaram | H04B 10/803 |
| 2019/0199445 A1* | 6/2019 | Sundaram | H04B 10/803 |
| 2019/0207681 A1* | 7/2019 | Sundaram | H04B 10/40 |

OTHER PUBLICATIONS

"International Application Serial No. PCT/US2016/054462, Written Opinion dated May 23, 2017", 12 pgs.

* cited by examiner

FREE AIR OPTICAL INTERCONNECT BEACON MODE

PRIORITY APPLICATION

This application is a U.S. National Stage Filing under 35 U.S.C. 371 from International Application No. PCT/US2016/054462, filed on Sep. 29, 2016, and published as WO 2018/063249, which application is incorporated herein by reference in its entirety.

TECHNICAL FIELD

Embodiments pertain to high speed interconnections in electronic systems, and more specifically to optical communication interfaces between electronic devices.

BACKGROUND

Electronic systems often include electronic devices that communicate signals to each other. Designers of electronic systems strive to increase the speed of the communication among devices while keeping the communication link robust. Wireless connections can be more robust than wired connections because of the elimination of the need for mechanical contact that may be susceptible to wear. Wireless interfaces typically communicate using radio frequency (RF) signals. However, some limitations of RF communication interfaces include bandwidth limitations, signal interference, and overhead associated with RF protocols. Optical signals can be an alternative to RF and can achieve higher data rates. However, traditional optical interconnects require special fiber-optic cables, which can be more expensive than wired interfaces, and can require air tight glass-to-glass connections to prevent Fresnel reflections, making them less desirable and, in certain examples, impractical for day-to-day free-air interconnects. There is a general need for devices, systems and methods to address requirements for high-speed interconnections among electronic devices.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

There are many types of communication interfaces between electronic devices. These include universal serial bus (USB), mobile industry processor interface (MIPI), peripheral component interconnect (PCI), PCI express (PCIe), high definition multimedia interface (HDMI), thunderbolt (TBT), display port (DP) interface, and other serial busses and serial-parallel busses used in consumer electronics, enterprise class devices, wearable electronic devices, portable computers, and tablet computers. It is desirable to implement a wireless communication interface that can provide improved data rate and can adapt basic wireless interconnection with all of the protocols available and yet not be tied to any one specific protocol. An infrared-based (IR-based) interface is an alternative to an RF interface, but an IR-based interface involves conversion between protocols, which adds overhead to the communication. A laser-based optical interface would meet these requirements for the interconnection, but the cost of fiber optic based optical interconnections can be prohibitive.

A better option is a laser-based optical interface that does not use fiber optics to transmit and receive the laser emitted signals, but instead transmits the optical signals via free air space (e.g., a light amplitude modulation docking adapter, or LAMDA). This can be accomplished by communicating the optical signals over short distances (e.g., about ten millimeters, or 10 mm) so that signal loss is tolerable. The free air optical interface can scale to data rates up to ten gigabits per second (10 Gbps) and rates of one terabit per second (1 Tbps) may be available. This type of optical interface is not tied to any specific protocol and eliminates protocol overhead, which reduces the latency in communication to near zero latency. Further, the optical interface is agnostic to clock rate, making the interface compatible with high speed and low speed interfaces.

Figure 1:
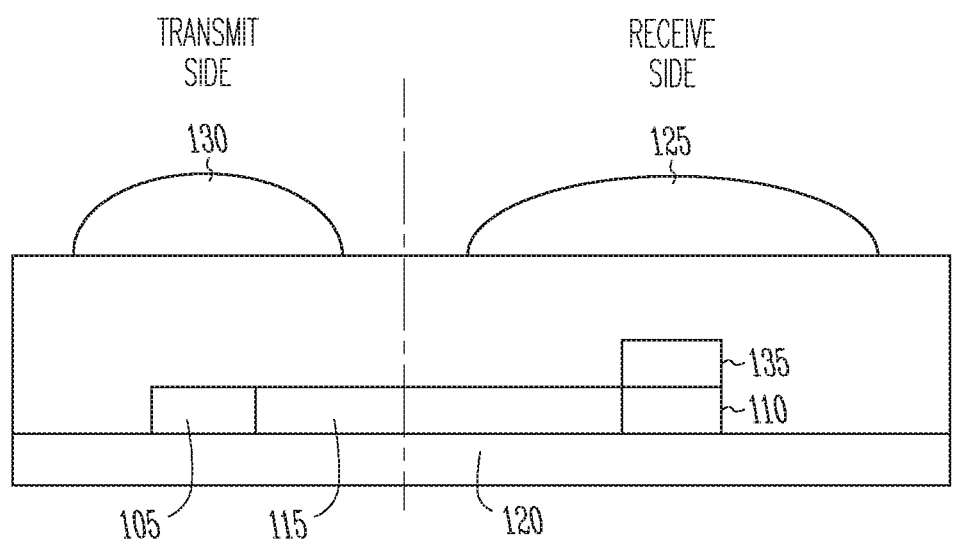
FIG. 1 is an illustration of an optical transmitter (TX) receiver (RX) pair in accordance with some embodiments.

FIG. 1 is an illustration of an embodiment of an optical transmitter (TX) receiver (RX) pair. The optical TX/RX pair can include a laser emitter 105, such as a laser diode or a vertical-cavity surface emitting laser (VCSEL) for example. The optical receiver can include a photodiode 110 to convert received laser energy into an electrical signal. When laser light falls on the photodiode 110, it produces a photo diode current. The current produced is proportional to the amount of laser light incident on the photodiode 110. When the laser light is modulated, the photodiode current varies with the intensity of the incident laser light. Data is received by detecting the laser modulation using the photodiode current.

A trans-impedance amplifier 115 (TIA) can be used to amplify the electrical signals generated by the photodiode 110. In some examples, the TIA provides an average of the photodiode current generated by the photodiode 110. The laser emitter 105, the photodiode 110 and the TIA 115 are arranged on a substrate 120. Some examples of the substrate 120 include a printed circuit board (PCB) made of plastic, plastic laminate (E.g., FR4) or ceramic.

To form a serial duplex optical interface, a second optical TX/RX pair can be positioned opposite the optical TX/RX pair in FIG. 1. The laser emitter of the second optical TX/RX pair is arranged opposite the optical receiver of the first optical TX/RX pair to create a first communication lane, and the laser emitter of the first optical TX/RX pair is arranged opposite the optical receiver of the second TX/RX pair to form a second communication lane in the reverse direction from the first communication lane. An air gap separates the two TX/RX pairs. The separation between the two optical TX/RX pairs is small (e.g., about 2.5 mm). The small separation allows for the receivers to reliably detect the laser energy from the laser emitters. The TX/RX pair can include a lens 125 to focus incident laser energy onto the photodiode 110. The TX/RX pair may also include a second lens 130 to focus the emitted laser energy toward the receiving photodiode across the air gap. The lenses 125, 130 may be epoxy molded lenses.

In some embodiments, the photodiode 110 has a wide spectral response (e.g., an indium gallium arsenide (InGaAs) photodiode). The wide spectral response is desirable for detection of laser energy transmitted over air, but can cause problems of crosstalk between the two communication lanes. To reduce or eliminate crosstalk between communication lanes, a laser bandpass filter 135 is arranged above the photodiode 110 of each TX/RX pair. In some embodiments, the laser bandpass filter 135 can be a Lyot filter or a dichroic filter arranged above the photodiode 110. In some embodiments, the laser bandpass filter 135 is formed as a coating (e.g., an anti-reflective coating, or ARC) on the photodiode using ion beam sputtering (IBS). In some embodiments, the laser bandpass filter 135 is formed as a coating on the lens 125.

The laser bandpass filter 135 of a TX/RX pair has a passband that excludes the center frequency of the laser energy emitted by the laser emitter 105 of the TX/RX pair, but the passband includes the center frequency of the laser energy emitted by the laser emitter of the communication lane of the photodiode 110. Thus, the laser bandpass filter 135 reduces or eliminates laser energy from one communication lane from being detected by the other communication lane. In some embodiments, the center frequency of a laser emitter is assigned based on whether the laser emitter is included in a host device (e.g., a computing device or a mobile communication device) or a peripheral device (e.g., a disk drive). If a TX/RX pair is included in a host device, the TX/RX pair includes a laser emitter having a first center frequency and a laser bandpass filter that excludes the first center frequency. If a TX/RX pair is included in a peripheral device, the TX/RX pair includes a laser emitter having a second center frequency and a laser bandpass filter that excludes the second center frequency and passes the first center frequency. The TX/RX pair of the host device includes a laser bandpass filter that passes the second center frequency. Thus, the passband of the laser bandpass filter may be selected according to whether the TX/RX pair is included in the host device or peripheral device.

Figure 2:
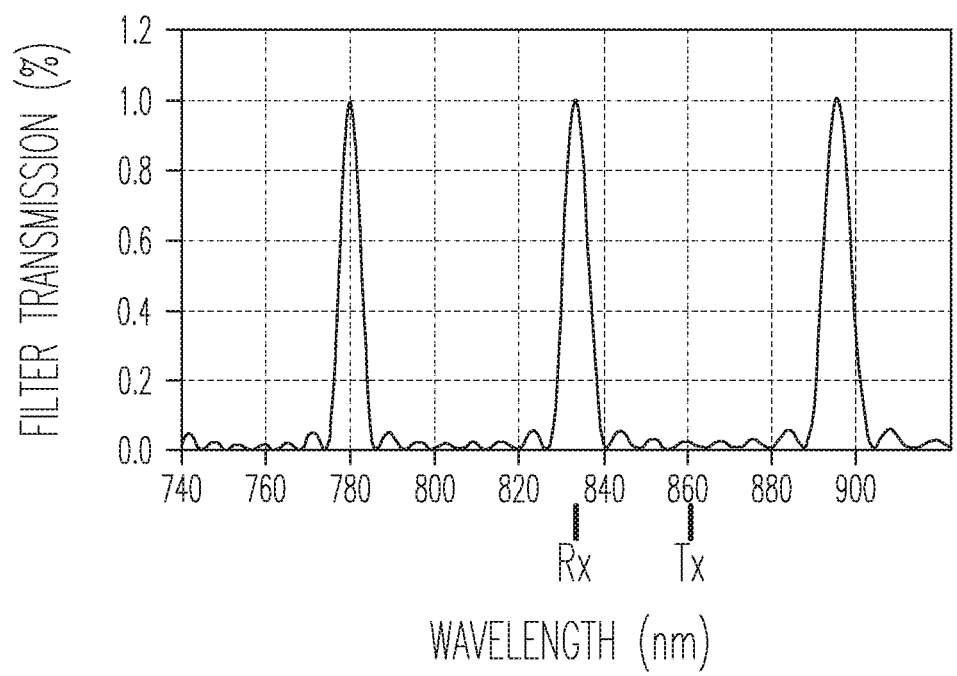
FIG. 2 is an example of a filter characteristic for a laser bandpass filter in accordance with some embodiments.

FIG. 2 is an example of a filter characteristic for a laser bandpass filter. The example is intended to be illustrative and non-limiting. The filter characteristic shows filter transmission versus wavelength. In the example, a host device laser emitter emits laser energy with a wavelength of 855 nanometers (nm), and a peripheral laser emitter emits laser energy with a wavelength of 830 nm. FIG. 2 shows an example of a filter characteristic for the host device. The filter shows very high attenuation at 855 nm and shows that the passband of the filter includes 830 nm.

Figure 3:
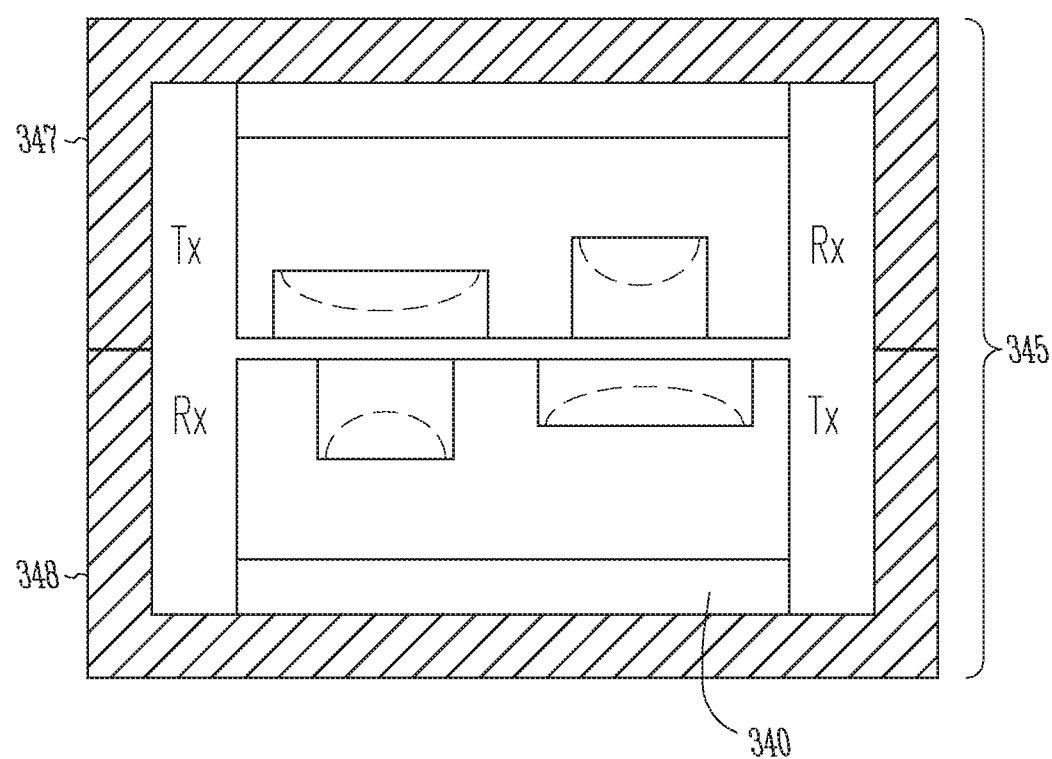
FIG. 3 is an illustration of an arrangement of optical TX/RX pairs in accordance with some embodiments.

FIG. 3 is an illustration of an embodiment of an arrangement between optical TX/RX pairs of the host side of the optical interface and the peripheral side of the optical interface. An optical TX/RX pair may be electrically connected to logic circuitry 340 on the substrate. The logic circuitry can include hardware circuits, or can include an embedded controller executing instructions in firmware or software. The logic circuitry 340 transmits and receives signals communicated according to a duplex communication protocol, such as a USB protocol. In certain embodiments, the substrate is an electronics package substrate and the laser emitter 305, the photodiode 310, and the logic circuitry 340 may be included in the same electronics package, such as a system on chip (SoC) implementation for example. The optical interface can include a mechanical connector 345 to house the interface and protect against interference from outside sources. The mechanical connector 345 may include first connector body portion 347 and a second connector body portion 348. The optical interface host side can be included in the first connector body portion 347 and the optical interface peripheral side can be included in the second connector body portion 348. Mating the two connector body portions places the TX laser emitters opposite the RX photodiodes across a small air gap or air space to form the communication lanes of the optical interface.

Data is sent between devices or between optical links of the optical interface by transmitting laser energy via free air. It is desirable to keep the laser power low and also to prevent the laser emitters from firing into free air without any mechanical protective cover. This prevents the optical interface from exceeding class 1 laser certification. For consumer class devices, it is desirable for safety reasons to keep the laser emitters off until the two connector portions are joined and the two links of the optical interconnection are completely covered without laser light leaking or reflecting out from any side of the connector.

Figure 4:
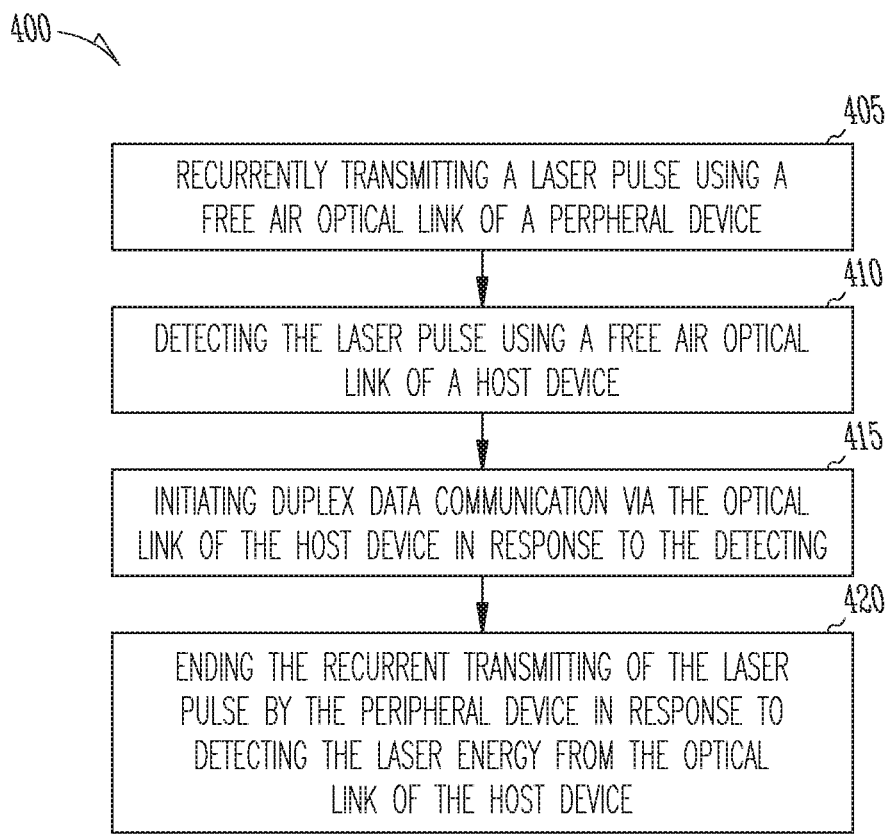
FIG. 4 is a flow diagram of a method of operating a free air optical interconnection in accordance with some embodiments.

FIG. 4 is a flow diagram of a method 400 of operating a free air optical interconnection. To meet the safety requirements for consumer devices and to meet class 1 laser certification, an optical interconnect startup protocol is used in which the host device does not begin to communicate laser pulses until the peripheral recipient of the communication is present. Once the optical interconnection is established, a standard communication protocol (e.g., the USB protocol) can be followed. A processor of the host device can be agnostic to the fact that an optical link instead of a wired link is being used for the communication.

At 405, the optical link of the peripheral device recurrently transmits a laser pulse (e.g., laser energy with a pulse width between 1200 nanometers (1200 nm) and 10 milliseconds (10 ms)). In some embodiments, the peripheral device transmits a laser pulse periodically (e.g., at 300 ms intervals). This recurrent laser pulse can be viewed as a beacon.

At 410, the laser pulse from the peripheral device is detected using the optical link of a host device. In response to detecting the laser pulse, at 415 the host device initiates transmission of laser energy according to a duplex data communication protocol using its optical link. At 420, the peripheral device ends the recurrent transmitting of a laser pulse in response to detecting the laser energy from the optical link of the host device. In some embodiments, the optical interface includes two communication lanes (e.g., two TX/RX pairs as in FIG. 3) for data communication in each direction between the host device and the peripheral device. In some variations, the optical interface includes more than two TX/RX pairs (e.g., four) to provide additional communication lanes in the optical interface. In some embodiments, the optical links of the host device and peripheral device communicate data according to a USB communication protocol.

Figure 5:
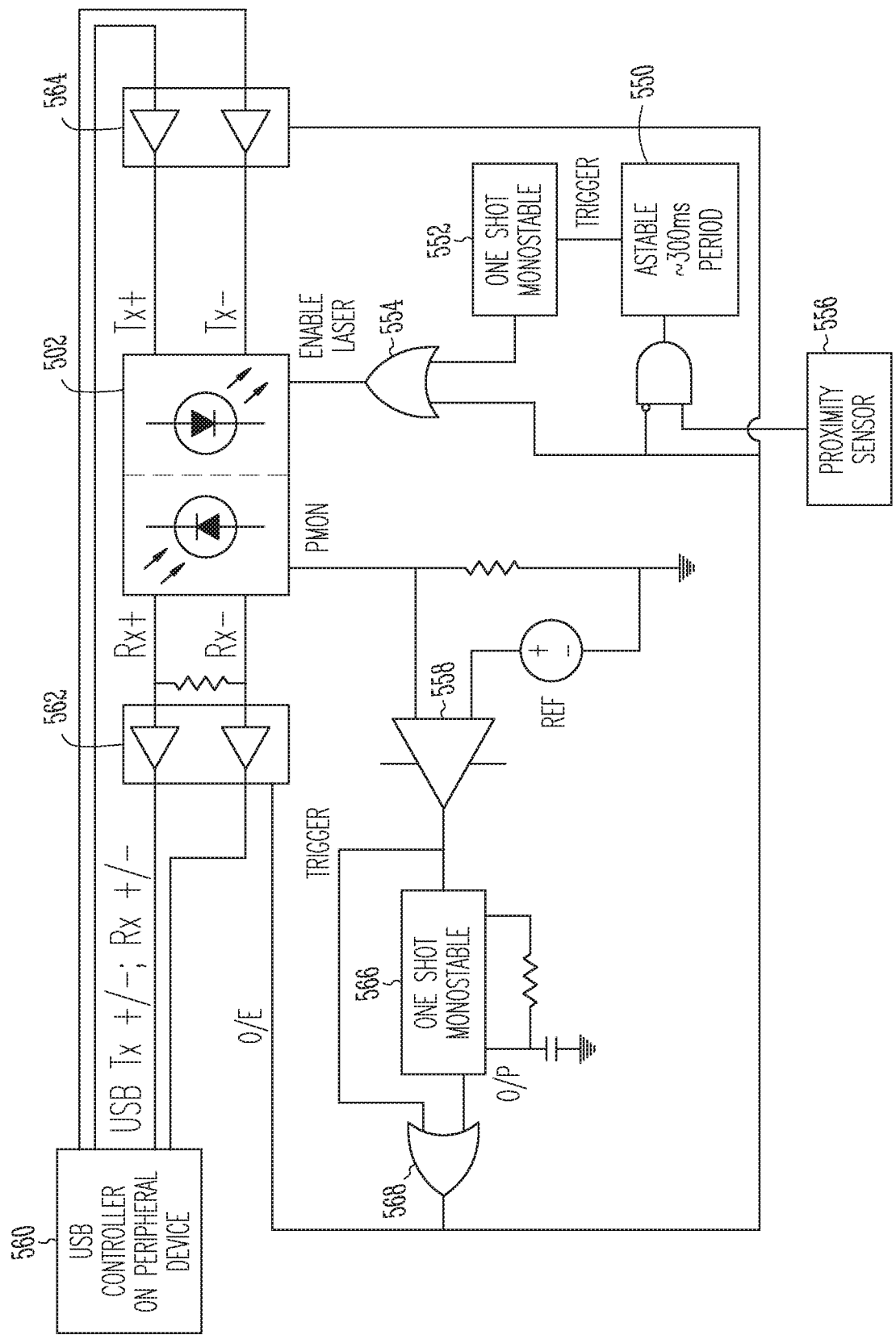
FIG. 5 is a schematic of an embodiment of a circuit for the peripheral side of a free air optical interface. in accordance with some embodiments.

FIG. 5 is a schematic of an embodiment of a circuit for the peripheral side of a free air optical interface. The optical link of the peripheral device includes an optical TX/RX pair 502 including a laser emitter 505 and a photodiode 510. FIG. 5 shows that the circuit also includes logic circuitry. The logic circuitry can include a timer 550 and a one shot circuit 552 or monostable to initiate transmission of a laser pulse. When communication between devices is not established, the timer 550 triggers a pulse from the one shot circuit 552 that is provided to OR gate 554. The output from the OR gate 554 is provided to the laser emitter 505 to enable a laser pulse. The output stage of the OR gate may be sufficient to drive the laser emitter or the circuit may include a drive amplifier to drive the laser emitter. The timer 550 continues (e.g., periodically) to initiate the laser pulses. This can be viewed as a beacon mode.

In some embodiments, the peripheral device includes a proximity sensor 556 to detect the presence of the host device before entering beacon mode. In certain embodiments, the host device includes a magnetic material and the proximity sensor is a Hall effect sensor. In certain embodiments, the proximity sensor includes a capacitive sensor or inductive sensor to sense a metallic or conductive material of the host device. In some embodiments, the magnetic, metallic, or conductive material of the host device is included in a connector for the optical interface and the proximity detector detects the host device when the host portion of the connector and the peripheral portion of the connector are joined. The proximity sensor 556 generates an indication (e.g., a specified electrical signal) when the host device is detected. The indication from the proximity sensor can be used to enable the timer 550 to initiate transmission of laser pulses in the beacon mode. This prevents the peripheral device from entering beacon mode until the host device is present. When the host device is no longer present, the indication from the proximity sensor ceases. The logic circuitry leaves beacon mode and ends the recurrent transmission of the laser pulse by the laser emitter in the absence of the indication that the host device is available When the host device detects the laser energy from the beacon mode, the host device begins to transfer data using the optical interface. The host device may communicate using laser energy with the peripheral device according to a standard communication protocol with the exception that the physical interface is a free air optical interface instead of a wired interface. When the photodiode 510 detects the laser energy from the host device, the logic circuitry leaves the beacon mode and ends the recurrent transmission of laser pulses. Full transfer of data between the two devices begins.

As explained previously, the optical TX/RX pair 502 of the peripheral device may include a laser bandpass filter arranged above the photodiode 510. The laser energy emitted by the laser emitter 505 has a predetermined center frequency and the laser bandpass filter has a passband that excludes the center frequency of the transmitted laser energy. This prevents the peripheral side photodiode 510 from detecting the laser pulses from the peripheral side laser emitter 505.

In some embodiments, the photodiode and TIA circuitry of the optical TX/RX pair 502 in FIG. 5 generates an average photodiode current or photocurrent PMON. The magnitude of PMON starts to increase when laser energy of a specific wavelength from the host device falls on the photodiode 510. The circuit includes a comparator circuit 558 electrically coupled to the logic circuitry. The comparator circuit 558 detects when average level of photocurrent (PMON) exceeds a specified current level value (Ref) and generates an indication that the average photocurrent level exceeds the specified current level. The logic circuitry leaves the beacon mode and ends the recurrent transmission of the laser pulse in response to the indication from the comparator circuit 558.

In addition to causing the beacon mode to end, the detected laser energy enables the peripheral device to enter a normal operating mode where data is transferred between devices. The data may be transferred according to a duplex communication protocol and the beacon mode ends when the laser energy is received according to the protocol. In some embodiments, the laser energy is received according to a USB communication protocol and enables communication of laser pulses according to a peripheral side protocol of the USB communication protocol.

FIG. 5 shows that the peripheral device includes a USB controller 560, although this is only an example and the controller may be for any standard or proprietary communication bus. The logic circuitry includes a buffer 562 electrically coupled to a receive port of the USB controller and a buffer 564 electrically coupled to a transmit port of the USB controller 560. In certain variations, the buffers 562, 564 include field effect transistor (FET) switches. The logic circuitry also includes a second one shot circuit 566 configured with OR gate 568 as a pulse stretcher and is electrically coupled to the output of the comparator circuit 558. In response to the indication from the comparator, the output of the one shot circuit 566 enables the buffers 562, 564. Enabling the buffers may change the impedance at the ports of the USB controller. This triggers the USB controller into full transfer of data in normal operating mode.

The data transfer continues as long as the host and peripheral device are within range and laser energy continues to be received from the host device. If the host device is no longer within range or ceases to send laser energy, the level of PMON starts to decrease until it becomes less than Ref. The output of the comparator circuit 558 changes state and the buffers 562, 564 are disabled. This may change the impedance at the ports of the USB controller 560 to disable the USB controller 560. The peripheral device may re-enter beacon mode when laser energy is no longer detected, or the peripheral device may re-enter beacon mode when a proximity sensor indicates that the host device is present.

Figure 6:
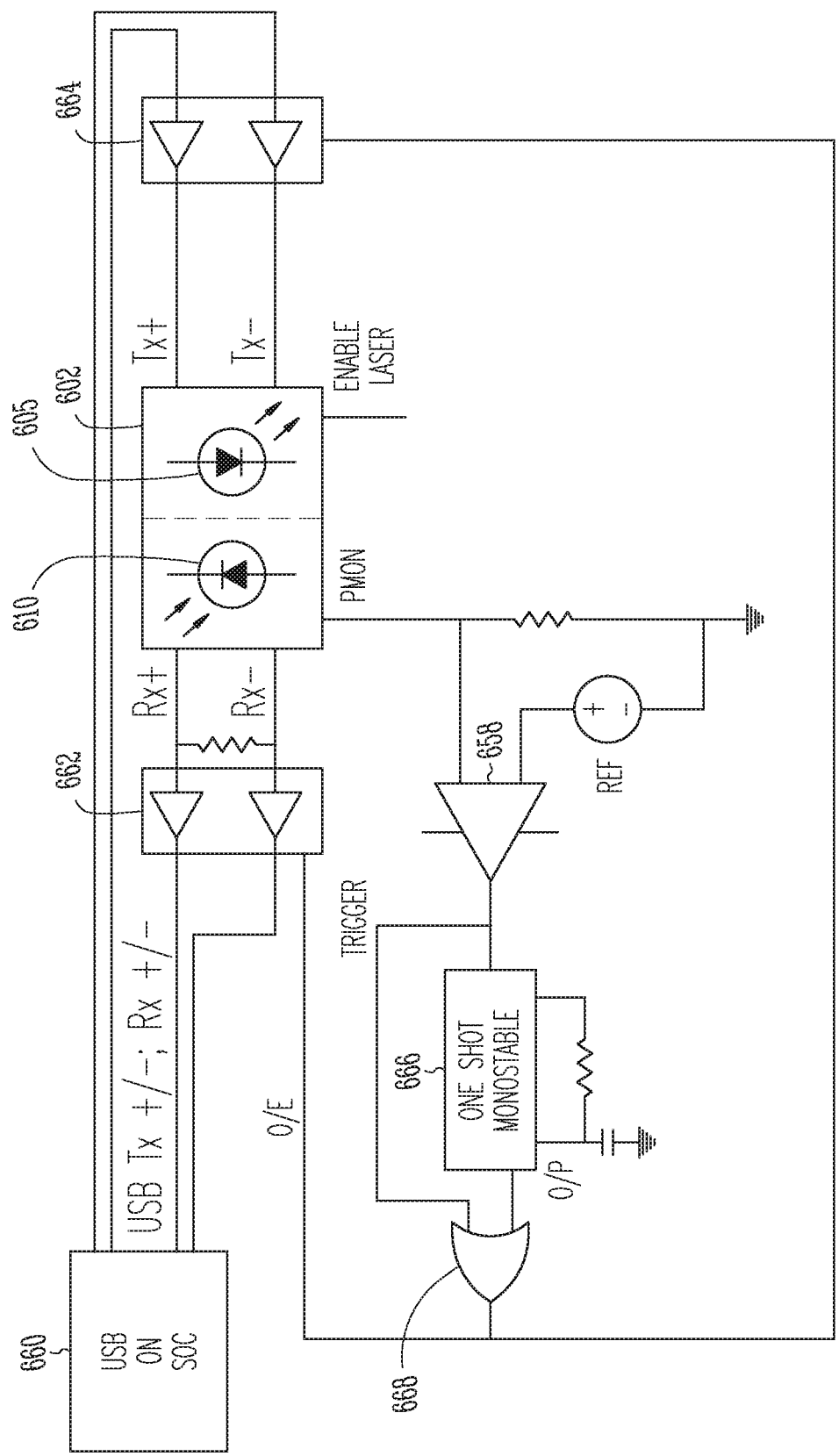
FIG. 6 is a schematic of an embodiment of a circuit for the host side of a free air optical interface. in accordance with some embodiments.

FIG. 6 is a schematic of an embodiment of a circuit for the host side of a free air optical interface. The optical link of the host device includes an optical TX/RX pair 602 including a laser emitter 605 and a photodiode 610. FIG. 6 shows that the circuit also includes logic circuitry. Laser energy sent in beacon mode from the peripheral device is detected by the photodiode 610. In response to the detection of the laser energy, the logic circuitry initiates transmission of pulses of laser energy by the laser emitter 605 according to a duplex communication protocol.

Similar to the circuit of FIG. 5, the photodiode and TIA circuitry of the optical TX/RX pair 602 in FIG. 6 generates an average photocurrent PMON. The magnitude of PMON starts to increase when the laser pulses of a predetermined laser energy wavelength from the peripheral device falls on the photodiode 610. The comparator circuit 658 detects when average level of photocurrent (PMON) exceeds a specified photocurrent level value (Ref) and generates an indication that the average photocurrent level exceeds the specified photocurrent level. The logic circuitry initiate the transmission of laser energy according to the duplex communication protocol in response to the indication. Similar to the embodiment shown in FIG. 5, a laser bandpass filter can be used to prevent the photodiode 610 from detecting the laser energy transmit by the laser emitter 605 of the same TX/RX pair.

FIG. 6 shows that the host device includes a USB hub 660. The logic circuitry includes a buffer 662 electrically coupled to a receive port of the USB hub 660 and a buffer

664 electrically coupled to a transmit port of the USB hub 660. The logic circuitry also includes a one shot circuit 666 configured with OR gate 668 as a pulse stretcher and the one shot circuit 666 is electrically coupled to the output of the comparator circuit 658. In response to the indication from the comparator, the output of the one shot circuit 566 enables the buffers 562, 564. Enabling the buffers may change the impedance at the ports of the USB hub. The change in impedance triggers the USB hub to begin transfer of data according to the USB protocol.

When the peripheral device is removed or otherwise does not send laser energy to the host device, the comparator circuit 658 will detect that the average level of photocurrent (PMON) of the photodiode 610 is less than a specified current level value. The output of the comparator circuit 658 changes state to indicate that the average photocurrent level is less than a specified current level. The logic circuitry ends the transmission of laser energy to the peripheral device in response to the decrease in average photocurrent level. The buffers 662, 664 are disabled and the change in impedance may trigger the USB hub to stop communicating data via the optical interface.

The peripheral side of the optical interface of FIG. 5 and the host side of the optical interface may be joined together using a connector that prevents laser light leaking out or reflecting out from any side of the connector. When joined, the peripheral side TX/RX pair and the host side TX/RX pair are separated by a small air gap over which laser energy is transmitted. This arrangement provides a duplex serial optical interface over an air space. The optical interface provides a robust communication link, and may be used to implement an optical interface for any one of a USB, a PCI or PCIe, an HDMI, a TBT interface, a DP interface or other serial and serial-parallel bus. The beacon protocol prevents the optical interface from class 1 laser certification. A proximity sensor can be used to prevent the peripheral device from entering the beacon mode until the portions of the connector are joined together to provide safety for consumer class devices.

The free air optical interface can be included in a personal computer (PC) or a mobile computing device such as a smart phone, tablet, compute stick, etc. The optical interface can be used to connect peripheral devices to the PC or mobile computing device. The optical interface can be included in a server, mini-server, or micro-server, and can be used for agnostic backplane connections to servers. The optical interface can be included in ultra-small or wearable devices where typical mechanical interconnections may be too bulky.

Figure 7:
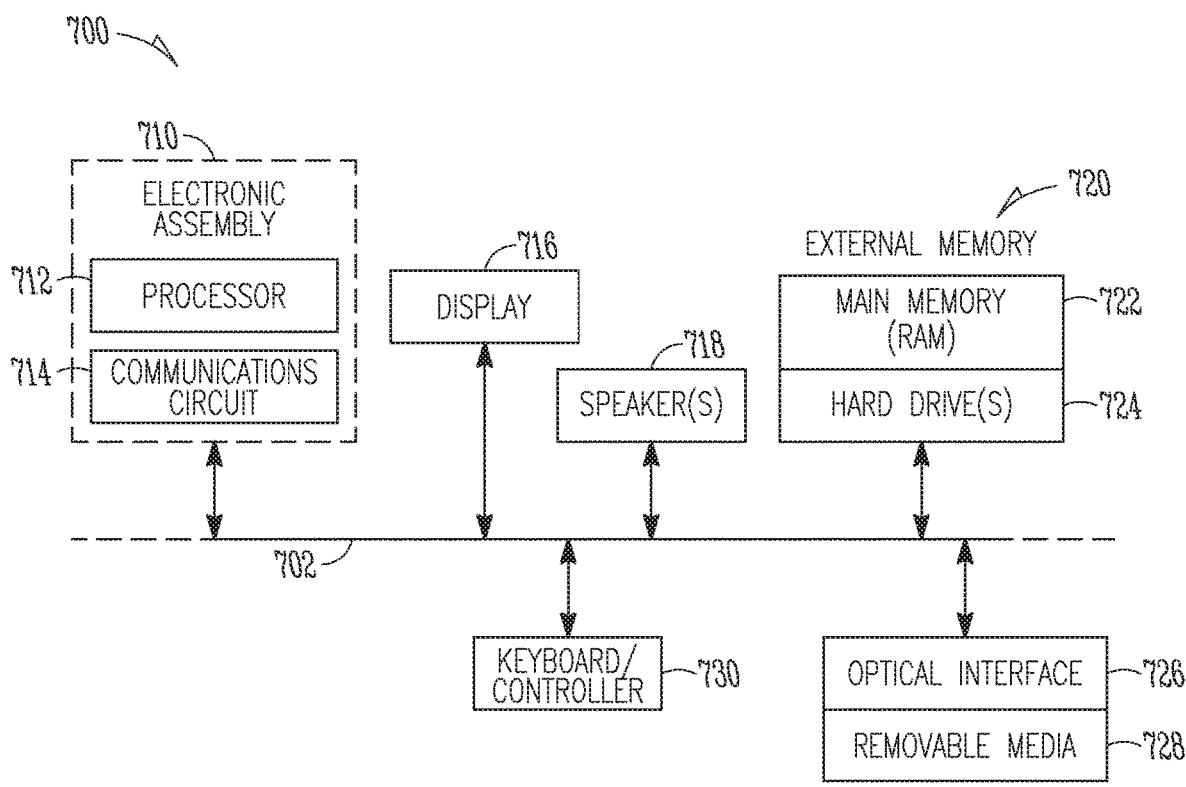
FIG. 7 is a block diagram of an example of an electronic system in accordance with some embodiments.

FIG. 7 is a block diagram of an example of an electronic system 700 incorporating at least one electronic circuit assembly and in accordance with at least one embodiment of the invention. Electronic system 700 is merely one example in which embodiments of the present invention can be used. Examples of electronic systems include, but are not limited to personal computers, tablet computers, mobile telephones, game devices, compute sticks etc. In this example, electronic system 700 comprises a data processing system that includes a system bus 702 to couple the various components of the system. System bus 702 provides communications links among the various components of the electronic system 700 and can be implemented as a single bus, as a combination of busses, or in any other suitable manner.

An electronic assembly 710 can be coupled to system bus 702. The electronic assembly 710 can include any circuit or combination of circuits. In one embodiment, the electronic assembly 710 includes a processor 712 which can be of any type. As used herein, "processor" means any type of computational circuit, such as but not limited to a microprocessor, a microcontroller, a complex instruction set computing (CISC) microprocessor, a reduced instruction set computing (RISC) microprocessor, a very long instruction word (VLIW) microprocessor, a graphics processor, a digital signal processor (DSP), multiple core processor, or any other type of processor or processing circuit.

Other types of circuits that can be included in electronic assembly 710 are a custom circuit, an application-specific integrated circuit (ASIC), or the like. The electronic assembly can include a communications circuit 714 for use in wireless devices like mobile telephones, personal data assistants, portable computers, two-way radios, and similar electronic systems.

The electronic system 700 can also include an external memory 720, which in turn can include one or more memory elements suitable to the particular application, such as a main memory 722 in the form of random access memory (RAM), one or more hard drives 724. The electronic assembly 710 can also include a free air optical interface 726 for removable media 728 such as compact disks (CD), flash memory cards, digital video disk (DVD), and the like.

The electronic system 700 can also include a display device 716, one or more speakers 718, and a keyboard and/or controller 730, which can include a mouse, trackball, touch screen, voice-recognition device, or any other device that permits a system user to input information into and receive information from the electronic system 700.

Additional Description and Examples

Example 1 can include subject matter (such as an apparatus) comprising: a laser emitter configured to transmit laser energy across an air gap to a separate device; a photodiode configured to detect laser energy received across the air gap from the separate device; and logic circuitry configured to initiate recurrent transmission of a laser pulse by the laser emitter; and end the recurrent transmission in response to detecting laser energy received by the photodiode from the separate device.

In Example 2, the subject matter of Example 1 optionally includes a proximity sensor electrically coupled to the logic circuitry and configured to detect presence of the separate device and generate an indication of the presence of the separate device, wherein the logic circuitry is configured initiate the recurrent transmission of the laser pulse by the laser emitter in response to the indication.

In Example 3, the subject matter of Example 2 optionally includes a proximity sensor that includes one or more of a Hall effect sensor, a capacitive sensor, and an inductive sensor.

In Example 4, the subject matter of one or both of Examples 2 and 3 optionally includes logic circuitry configured to end the recurrent transmission of the laser pulse by the laser emitter in the absence of the indication that the separate device is available.

In Example 5, the subject matter of one or any combination of Examples 1-4 optionally includes a comparator circuit electrically coupled to the logic circuitry, wherein the comparator circuit is configured to detect that an average level of photocurrent of the photodiode exceeds a specified current level value; generate an indication that the average photocurrent level exceeds the specified current level; and wherein the logic circuitry is configured to end the recurrent transmission of the laser pulse in response to the indication.

In Example 6, the subject matter of one or any combination of Examples 1-5 optionally includes logic circuitry configured to end the recurrent transmission in response to detecting laser energy received according to a duplex communication protocol received by the photodiode from the separate device.

In Example 7, the subject matter of one or any combination of Examples 1-6 optionally includes logic circuitry configured to end the recurrent transmission in response to detecting laser energy received according to a universal serial bus (USB) communication protocol, and enable communication of laser pulses according to a peripheral side protocol of the USB communication protocol.

In Example 8, the subject matter of one or any combination of Examples 1-7 optionally includes a substrate and a lens, wherein the laser emitter and photodiode are arranged on the substrate and the lens is arranged above the substrate and wherein the lens is configured to focus laser energy received over air toward the photodiode.

In Example 9, the subject matter of one or any combination of Examples 1-8 optionally includes a laser bandpass filter arranged above the photodiode, wherein laser energy emitted by the laser emitter has a center frequency and the bandpass filter has a passband that excludes the center frequency of the laser energy.

Example 10 can include subject matter (such as an apparatus), or can optionally be combined with one or any combination of Examples 1-9 to include such subject matter, comprising: a laser emitter configured to transmit laser energy across an air gap to a separate device; a photodiode configured to detect laser energy received across the air gap from the separate device; and logic circuitry configured to initiate transmission of pulses of laser energy by the laser emitter according to a duplex communication protocol in response to detection of laser energy by the photodiode.

In Example 11, the subject matter of Example 10 optionally includes a comparator circuit electrically coupled to the logic circuitry, wherein the comparator circuit is configured to detect that an average level of photocurrent of the photodiode exceeds a specified current level value; generate an indication that the average photocurrent level exceeds the specified current level; and wherein the logic circuitry is configured to initiate the transmission of laser energy according to the duplex communication protocol in response to the indication.

In Example 12, the subject matter of one or both of Examples 10 and 11 optionally includes a buffer electrically coupled to a receive port of a USB hub, wherein the logic circuitry is configured to enable the buffer to change an impedance at the receive port of the USB hub in response to the indication that the average photocurrent level exceeds the specified current level.

In Example 13, the subject matter of one or any combination of Examples 10-12 optionally includes a comparator circuit electrically coupled to the logic circuitry, wherein the comparator circuit is configured to detect that an average level of photocurrent of the photodiode is less than a specified current level value; generate an indication that the average photocurrent level is less than a specified current level; and wherein the logic circuitry is configured to end the transmission of laser energy to the separate device in response to the indication.

In Example 14, the subject matter of one or any combination of Examples 10-13 optionally includes logic circuitry configured to initiate transmission of pulses of laser energy by the laser emitter according to a universal serial bus (USB) communication protocol.

In Example 15, the subject matter of one or any combination of Examples 1-5 optionally includes the laser emitter, the photodiode and the logic circuitry being included in a host device.

Example 16 can include subject matter (such as an apparatus), or can optionally be combined with one or any combination of Examples 1-15 to include such subject matter, comprising an optical interface, the optical interface including: an optical interface peripheral side including a first laser emitter; a first photodiode; and peripheral side logic circuitry, wherein the peripheral side logic circuitry is configured to initiate recurrent transmission of a laser pulse by the first laser emitter; and an optical interface host side separated from the optical interface peripheral side by an air space, the optical interface host side including: a second laser emitter; a second photodiode; and host side logic circuitry, wherein the second photodiode is configured to detect the laser pulse transmitted by the first laser emitter, and wherein the host side logic circuitry is configured to initiate transmission of pulses of laser energy by the second laser emitter according to a duplex communication protocol in response to detection of the laser pulse by the second photodiode.

In Example 17, the subject matter of Example 16 optionally includes an optical interface peripheral side that is separable from the optical interface host side, wherein the optical interface peripheral side further includes a proximity sensor electrically coupled to the peripheral side logic circuitry and configured to detect presence of the optical interface host side and generate an indication of the presence of the optical interface host side, wherein the peripheral side logic circuitry is configured initiate the recurrent transmission of the laser pulse by the first laser emitter in response to the indication.

In Example 18, the subject matter of one or both of Examples 16 and 17 optionally includes host side logic circuitry is configured to initiate transmission of pulses of laser energy by the second laser emitter according to a universal serial bus (USB) communication protocol in response to the detection of the laser pulse by the second photodiode.

In Example 19, the subject matter of one or any combination of Examples 16-18 optionally includes an optical interface peripheral side that includes a first substrate and a first laser bandpass filter, wherein the first laser emitter and first photodiode are arranged on the first substrate, and the first bandpass filter is arranged above the first photodiode, wherein laser energy emitted by the first laser emitter has a first center frequency; wherein the optical interface host side includes a second substrate and a second laser bandpass filter, wherein the second laser emitter and second photodiode are arranged on the second substrate, and the second laser bandpass filter is arranged above the second photodiode, wherein laser energy emitted by the laser emitter has a second center frequency; and wherein a passband of the second laser bandpass filter excludes the second center frequency and includes the first center frequency, and a passband of the first laser bandpass filter excludes the first center frequency and includes the second center frequency.

In Example 20, the subject matter of Example 19 optionally includes first trans-impedance amplifier (TIA) on the first substrate and a second TIA on the second substrate, wherein the first laser emitter, the second photodiode and the second TIA form a first communication lane, and the second laser emitter, the first photodiode and the first TIA form a second communication lane.

These several non-limiting embodiments and examples can be combined using any permutation or combination. The Abstract is provided to allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus comprising:
 a laser emitter configured to transmit laser energy across an air gap to a separate device;
 a photodiode configured to detect laser energy received across the air gap from the separate device;
 logic circuitry configured to initiate recurrent transmission of a laser pulse by the laser emitter; and end the recurrent transmission in response to detecting laser energy received by the photodiode from the separate device; and
 a comparator circuit electrically coupled to the logic circuitry, wherein the comparator circuit is configured to detect that an average level of photocurrent of the photodiode exceeds a specified current level value; generate an indication that the average photocurrent level exceeds the specified current level; and wherein the logic circuitry is configured to end the recurrent transmission of the laser pulse in response to the indication.

2. The apparatus of claim 1, a proximity sensor electrically coupled to the logic circuitry and configured to detect presence of the separate device and generate an indication of the presence of the separate device, wherein the logic circuitry is configured initiate the recurrent transmission of the laser pulse by the laser emitter in response to the indication.

3. The apparatus of claim 1, wherein the proximity sensor includes one or more of a Hall effect sensor, a capacitive sensor, and an inductive sensor.

4. The apparatus of claim 1, wherein the logic circuitry is configured to end the recurrent transmission of the laser pulse by the laser emitter in the absence of the indication that the separate device is available.

5. The apparatus of claim 1, wherein the logic circuitry is configured to end the recurrent transmission in response to detecting laser energy received according to a duplex communication protocol received by the photodiode from the separate device.

6. The apparatus of claim 1, wherein the logic circuitry is configured to end the recurrent transmission in response to detecting laser energy received according to a universal serial bus (USB) communication protocol, and enable communication of laser pulses according to a peripheral side protocol of the USB communication protocol.

7. The apparatus of claim 1, including a substrate and a lens, wherein the laser emitter and photodiode are arranged on the substrate and the lens is arranged above the substrate and wherein the lens is configured to focus laser energy received over air toward the photodiode.

8. The apparatus of claim 1, including a laser bandpass filter arranged above the photodiode, wherein laser energy emitted by the laser emitter has a center frequency and the bandpass filter has a passband that excludes the center frequency of the laser energy.

9. An apparatus comprising:
 a laser emitter configured to transmit laser energy across an air gap to a separate device;
 a photodiode configured to detect laser energy received across the air gap from the separate device;
 logic circuitry configured to initiate transmission of pulses of laser energy by the laser emitter according to a duplex communication protocol in response to detection of laser energy by the photodiode; and
 a comparator circuit electrically coupled to the logic circuitry, wherein the comparator circuit is configured to detect that an average level of photocurrent of the photodiode exceeds a specified current level value; generate an indication that the average photocurrent level exceeds the specified current level; and wherein the logic circuitry is configured to initiate the transmission of laser energy according to the duplex communication protocol in response to the indication.

10. The apparatus of claim 9, wherein the logic circuitry includes a buffer electrically coupled to a receive port of a USB hub, wherein the logic circuitry is configured to enable the buffer to change an impedance at the receive port of the USB hub in response to the indication that the average photocurrent level exceeds the specified current level.

11. The apparatus of claim 9, including a comparator circuit electrically coupled to the logic circuitry, wherein the comparator circuit is configured to detect that an average level of photocurrent of the photodiode is less than a specified current level value; generate an indication that the average photocurrent level is less than a specified current level; and wherein the logic circuitry is configured to end the transmission of laser energy to the separate device in response to the indication.

12. The apparatus of claim 9, wherein the logic circuitry is configured to initiate transmission of pulses of laser energy by the laser emitter according to a universal serial bus (USB) communication protocol.

13. The apparatus of claim 9, wherein the laser emitter, photodiode and logic circuitry are included in a host device.

14. An apparatus comprising an optical interface, the optical interface including:
 an optical interface peripheral side including a first laser emitter; a first photodiode; and peripheral side logic circuitry, wherein the peripheral side logic circuitry is configured to initiate recurrent transmission of a laser pulse by the first laser emitter;
 an optical interface host side separated from the optical interface peripheral side by an air space, the optical interface host side including: a second laser emitter; a second photodiode; and host side logic circuitry, wherein the second photodiode is configured to detect the laser pulse transmitted by the first laser emitter, and wherein the host side logic circuitry is configured to initiate transmission of pulses of laser energy by the second laser emitter according to a duplex communication protocol in response to detection of the laser pulse by the second photodiode; and
 a comparator circuit electrically coupled to the host side logic circuitry, wherein the comparator circuit is configured to detect that an average level of photocurrent of the second photodiode exceeds a specified current level value; generate an indication that the average photocurrent level exceeds the specified current level; and wherein the host side logic circuitry is configured to initiate the transmission of laser energy according to the duplex communication protocol in response to the indication.

15. The apparatus of claim 14, wherein the optical interface peripheral side is separable from the optical interface host side, wherein the optical interface peripheral side further includes a proximity sensor electrically coupled to the peripheral side logic circuitry and configured to detect presence of the optical interface host side and generate an indication of the presence of the optical interface host side, wherein the peripheral side logic circuitry is configured initiate the recurrent transmission of the laser pulse by the first laser emitter in response to the indication.

16. The apparatus of claim 14, wherein the host side logic circuitry is configured to initiate transmission of pulses of laser energy by the second laser emitter according to a universal serial bus (USB) communication protocol in response to the detection of the laser pulse by the second photodiode.

17. The apparatus of claim 14,
wherein the optical interface peripheral side includes a first substrate and a first laser bandpass filter, wherein the first laser emitter and first photodiode are arranged on the first substrate, and the first bandpass filter is arranged above the first photodiode, wherein laser energy emitted by the first laser emitter has a first center frequency;

wherein the optical interface host side includes a second substrate and a second laser bandpass filter, wherein the second laser emitter and second photodiode are arranged on the second substrate, and the second laser bandpass filter is arranged above the second photodiode, wherein laser energy emitted by the laser emitter has a second center frequency; and wherein a passband of the second laser bandpass filter excludes the second center frequency and includes the first center frequency, and a passband of the first laser bandpass filter excludes the first center frequency and includes the second center frequency.

18. The apparatus of claim 17, including a first trans-impedance amplifier (TIA) on the first substrate and a second TIA on the second substrate, wherein the first laser emitter, the second photodiode and the second TIA form a first communication lane, and the second laser emitter, the first photodiode and the first TIA form a second communication lane.

* * * * *